United States Patent [19]

Dixon

[11] Patent Number: 5,084,998
[45] Date of Patent: Feb. 4, 1992

[54] FISHHOOK WITH COATING OF LOW-FRICTION MATERIAL

[76] Inventor: William T. Dixon, 2142 S. Fairway, Springfield, Mo. 65804

[21] Appl. No.: 503,233

[22] Filed: Apr. 2, 1990

[51] Int. Cl.⁵ ............................................. A01K 83/00
[52] U.S. Cl. .................................................. 43/43.16
[58] Field of Search ............................ 43/43.16, 44.82

[56] References Cited

U.S. PATENT DOCUMENTS

| | | | |
|---|---|---|---|
| 1,838,981 | 12/1931 | Anderson | 43/43.16 |
| 2,990,641 | 7/1961 | Weidman | 43/43.16 |
| 3,758,976 | 9/1973 | Szwolkon | 43/43.16 |
| 4,715,142 | 12/1987 | Richard | 43/43.16 |
| 4,858,371 | 8/1989 | Preiser | 43/43.16 |
| 4,928,423 | 5/1990 | Furuta | 43/43.16 |

FOREIGN PATENT DOCUMENTS

| | | | |
|---|---|---|---|
| 0158878 | 12/1981 | Japan | 43/43.16 |
| 1200511 | 7/1970 | United Kingdom | 43/43.16 |

OTHER PUBLICATIONS

*Handbook of Chemistry and Physics,* 44th ed., p. 2220.

Primary Examiner—Kurt Rowan
Attorney, Agent, or Firm—Senniger, Powers, Leavitt & Roedel

[57] ABSTRACT

A fishhook of the present invention comprises a shank, and a curved butt portion extending from one end of the shank. The shank, and curved butt portion are made of a first material. A coating of a second material substantially covers the curved butt portion. The second material has a coefficient of static friction of less than 0.3.

7 Claims, 1 Drawing Sheet

FISHHOOK WITH COATING OF LOW-FRICTION MATERIAL

BACKGROUND OF THE INVENTION

This invention relates generally to fishhooks and more specifically to a fishhook having a coating of low-friction material.

There are countless artifices employed to catch fish using some form of a fishhook. Many of the devices are directed to the luring of fish to strike the fishhook. However, in order to successfully catch the fish, it must not only strike the fishhook, but the fish must become caught on the fishhook. Accordingly, many fishhooks have been designed to improve the "set" of the hook in the mouth of the fish. These designs frequently address the problem of positioning the fishhook in the fish's mouth, but do not address the problem of quickly penetrating the flesh in the mouth of the fish to securely hook the fish. Even if the fishhook is properly oriented in the mouth, lack of a sufficiently deep penetration of the fishhook into the flesh can result in the fish working itself free from the hook, and also in undesirable tearing of the flesh in the mouth.

SUMMARY OF THE INVENTION

Among the several objects of the present invention may be noted the provision of a fishhook which quickly penetrates the flesh of the fish in its mouth; the provision of such a hook which will break down (disintegrate) when exposed to the elements over a period of time so as not to present a hazard if the fishhook is lost; and the provision of such a fishhook which is inexpensively manufactured.

Generally, a fishhook constructed according to the principles of the present invention comprises a shank, and a curved butt portion extending from one end of the shank. The shank, and curved butt portion are made of a first material. A coating of a second material having a coefficient of friction less than 0.3 substantially covers the curved butt portion.

Other objects and features will be in part apparent and in part pointed out hereinafter.

BRIEF DESCRIPTION OF THE DRAWING

Corresponding reference characters indicate corresponding parts throughout the several views of the drawings.

DETAILED DESCRIPTION OF A PREFERRED EMBODIMENT

Figure 1:
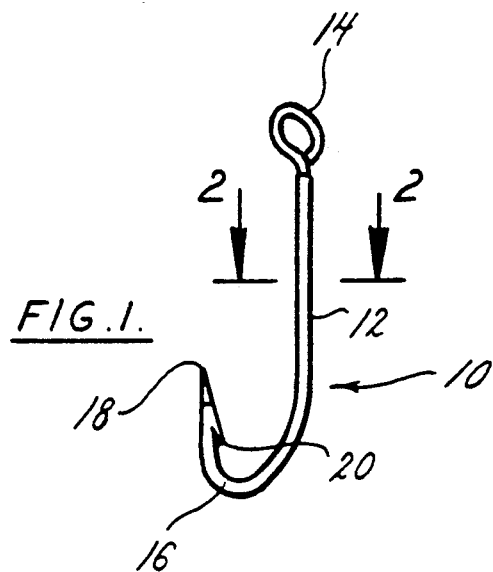
FIG. 1 is an elevation of a fishhook of the present invention.

As shown in FIG. 1, the fishhook of the present invention, indicated generally at 10 includes a shank 12, and an eye 14 at one end of the shank for securing the hook to fishing line. A curved butt portion 16 extends from another end of the shank 12 opposite the eye 14 and terminates in a point 18 at an end of the curved butt portion 16 opposite the shank. A barb 20 projects laterally from the point 18 and curved butt portion 16. It is to be understood that a fishhook may lack a barb and still fall within the scope of the invention. Although in the preferred embodiment, the eye 14 is integrally formed with the shank 12, the eye and shank may be separate and still fall within the scope of the present invention. For instance, some lures consist of a body designed to attract the fish. The shank 12, butt portion 16, point 18 and barb 20 project from one portion of the lure body while the eye 14 projects from another portion of the body.

Figure 2:
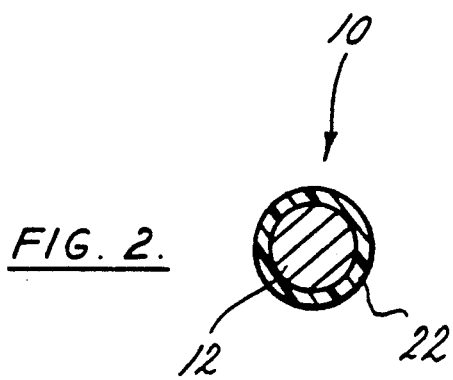
FIG. 2 is a section taken in the plane including line 2—2 of FIG. 1.

The shank 12, eye 14, curved butt portion 16, point 18 and barb 20 are integrally formed and made of a first material. As shown in FIG. 2, a coating 22 of a second material having a coefficient of static friction less than 0.3 substantially covers the first material. For purposes of the this description, the coefficient of static friction is defined as the ratio of the force required to move from a stationary position one surface made of the second material over another surface made of the second material to the total force pressing the two surfaces together. Further, the coefficient of friction as used herein is that established when the two surfaces are clean and at room temperature.

The first material may be steel or other metal commonly used in the manufacture of fishhooks. In the preferred embodiment the second material is polytetraflouroethylene, often identified by the trademark TEFLON owned by E. I. duPont Nemours & Co., Inc., the orginator of the material. The coefficient of static friction of TEFLON is 0.04 (Source: *Handbook of Chemistry and Physics* (68th ed.), CRC Press, 1987: p. F-16). It is believed that other fluorinated polymers such as fluorinated ethylene propylene (FEP), perfluoroalkoxy resins (PFA), polyvinylidene fluoride (PVDF), polychlorotrifluoroethylene (PCTFE), ethylene-chlorotrifluoroethylene (ECTFE) may also be used for the coating. It is believed that low friction non-fluoro polymer coatings such as graphite may also be employed. TEFLON is the preferred coating because it has the lowest coefficient of friction. The coating 22 is preferable of uniform thickness and in the range of about 0.001 inches to about 0.0001 inches thick. A relatively thin coating reduces product cost. It is believed that a coating having a thickness falling within the range specified will last about a year under normal use.

The coating 22 is applied to the fishhook 10 starting at a point below the eye 14 and covers the remaining portions of the fishhook. As coating is applied to the point 18, it becomes somewhat rounded and loses some of its sharpness. Therefore, the point 18 is resharpened after the coating 22 is applied, which leaves the point free of the coating. The sharpening should be carried out so that there is a smooth tapered transition from the tip to the coated portion of the fishhook to avoid any blunt edges which might inhibit a smooth penetration of the tip, barb and butt portion into the flesh of the fish. In the fish's mouth, the sharp point 18 makes the initial penetration of the flesh. As the fishhook 10 makes further penetration, the coated barb 20 and butt portion 16 engage the flesh. The coating, unlike the materials normally used to make fishhooks, offers little frictional resistance to further entry of the fishhook into the flesh. Therefore, the fishhook 10 may achieve a relatively quick and deep penetration of the flesh to facilitate a quick and secure hook set. A more shallow penetration of the flesh, such as might occur due to frictional resistance of a fishhook made of steel, can result in the fish freeing itself from the hook and/or in tearing of the flesh as the point is pulled across a wall of the mouth.

The coating 22 is also resistant to rust, which increases the life of a fishhook lying unused in a tackle box. However, because the eye 14 and the point 18 are free of the coating, the fishhook 10 will eventually rust out beginning at these points. The decomposition is accelerated when the fishhook is exposed to the elements such as when submerged under water. This feature is believed to prevent lost hooks, whether lying on a lake bed or embedded in the flesh of a fish, from becoming safety or environmental hazards because of an inability to break down. It is to be understood, however, that a fishhook having both its point and its eye covered by a coating material, as herein described, still falls within the scope of the present invention.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A fishhook comprising a shank, and a curved butt portion extending from one end of the shank, the shank, and butt portion being made of a first material, and a coating of a second material substantially covering the butt portion, said second material having a coefficient of static friction of less than 0.15, and wherein the curved butt portion includes a point at its end opposite the shank, the point being free of said coating thereby providing a sharp tip to facilitate penetration of the fishhook into the flesh of the fish.

2. A fishhook as set forth in claim 1 further comprising an eye of said first material located at the end of the shank opposite the curved butt portion, the eye being free of said coating.

3. A fishhook comprising a shank, and a curved butt portion extending from one end of the shank, the shank, and butt portion being made of a first material, and a coating of a second material substantially covering the butt portion, said second material having a coefficient of static friction of less than 0.15, and further comprising an eye of said first material located at another end of the shank opposite the curved butt portion, the eye being free of said coating.

4. A fishhook comprising a shank, an eye at one end of the shank, a curved butt portion extending from another end of the shank opposite the eye, a point at an end of the curved butt portion opposite the shank, the shank, eye, curved butt portion, and point being made of a first material, and a coating of a second material substantially covering the fishhook except for the point and the eye which are free of said coating, said second material having a coefficient of static friction less than 0.1.

5. A fishhook as set forth in claim 4 wherein said coating has a thickness of less than 0.01 inches.

6. A fishhook as set forth in claim 5 wherein said coating has a thickness greater than 0.0001 inches.

7. A fishhook comprising a shank, and a curved butt portion extending from one end of the shank, the shank and butt portion being made of a first material, and a coating of a second material substantially covering the butt portion, wherein said second material is a fluorinated polymer such as polytetraflouroethylene.

* * * * *